United States Patent [19]

van de Nieuwelaar

[11] Patent Number: 4,724,581
[45] Date of Patent: Feb. 16, 1988

[54] EVISCERATING DEVICE

[75] Inventor: Josephus A. van de Nieuwelaar, Germert, Netherlands

[73] Assignee: Stork PMT B.V., Netherlands

[21] Appl. No.: 702,084

[22] Filed: Feb. 15, 1985

[30] Foreign Application Priority Data

Feb. 16, 1984 [NL] Netherlands ........................ 8400506

[51] Int. Cl.4 ............................................ A22C 21/06
[52] U.S. Cl. ...................................................... 17/11
[58] Field of Search ............................................. 17/11

[56] References Cited

U.S. PATENT DOCUMENTS 2,189,752 2/1940 Breitschwerdt ........................ 17/11
4,019,222 4/1977 Scheier et al. .......................... 17/11

Primary Examiner—Willie G. Abercrombie
Attorney, Agent, or Firm—Newton, Hopkins & Ormsby

[57] ABSTRACT

Eviscerating device with a spoon at the end of an oblong carrier pivotable about an axis transversely on the longitudinal axis of the carrier, and with a rounded front edge and a longitudinal slot in the longitudinal direction of the spoon, opening into an asymmetrical widened entry section, such that at corresponding positions along the axis of symmetry of the longitudinal slot the distance from the edge of the widened entry section is larger for one spoon half than it is for the other.

6 Claims, 5 Drawing Figures

EVISCERATING DEVICE

BACKGROUND OF THE INVENTION

The invention relates to a device for the removal of the internal organs of slaughtered poultry, comprising a spoon which is attached to the end of an oblong carrier, is pivotable about an axis lying transversely on the longitudinal axis of the carrier, and has a rounded front edge and a longitudinal slot running in the longitudinal direction of the spoon and opening in a widened entry section. A device of this type is known per se.

In a step preceding this removal of the entrails, the head has already been pulled off the neck. In this step, the gullet breaks between crop and beak and the windpipe breaks close to the fork to the lungs. The gullet part between crop and gizzard, which crosses the spine at a sharp angle at the position of the windpipe fork, must remain intact and come to rest in the longitudinal slot when the spoon is turned over. In order to achieve this and at the same time to prevent one front edge of the spoon, after the latter has been turned over, from pressing against the gullet and damaging the latter—as a result of which the gullet breaks at the point of damage during removal and the crop is left behind in the bird—the front edge of a known spoon has already been designed with a greatly widened V-shaped entry section. This however reduces the effective width of the front edges of the spoons and causes difficulties during removal of the lungs. Shortening the spoon halves the risk of damage to the gullet, however extracting the lungs is impaired in this case also.

SUMMARY OF THE INVENTION

The object of the invention is to overcome this disadvantage and to provide a spoon configuration such that not only satisfactory removal of the lungs and entrails is ensured but also no damage to the gullet occurs and the latter reliably comes to rest in the longitudinal slot.

This object is achieved, according to the invention, in that the entry section is made asymmetrical in such a manner that, at corresponding positions along the axis of symmetry of the longitudinal slot, the distance to the edge of the widened entry section is larger for one spoon half than it is for the other.

As a result of this measure, damage to the gullet is prevented and the gullet reliably slides into the longitudinal slot when the spoon is turned over.

In the spoon configuration according to the invention the two spoon halves can be of equal length; a preferred embodiment is however characterized in that the spoon half, for which the distance mentioned is larger, is shorter than the other spoon half.

Further characteristics and advantages embodiments of the device according to the invention are mentioned in the subclaims. The presence of the widened opening at the end of the longitudinal slot has the advantage that the gullet is not jammed and that the packet of entrails is easily released by the spoon after completion of the removal.

SURVEY OF THE DRAWINGS

DESCRIPTION OF PREFERRED EMBODIMENT

Figure 2:
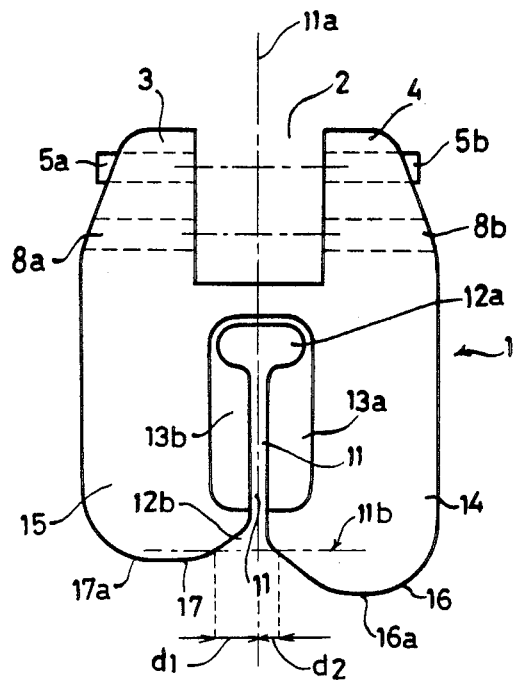
FIG. 2 is a plan view, on a larger scale, of the spoon used with the device according to the invention.
Figure 3:
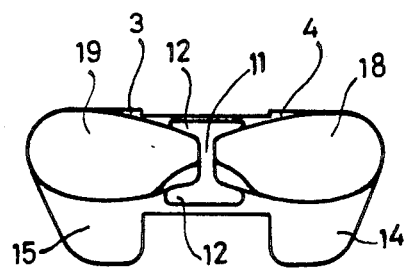
FIG. 3 is a front view of this spoon.

The spoon used according to the invention is (see, in particular, FIGS. 2 and 3) designated in its entirety by reference numeral 1. A recess 2 is provided on the rear end of the spoon, and a first bore 5a and 5b respectively for receiving the pivot axis 6, by means of which the spoon is attached to the oblong carrier 7 (see FIGS. 1a–1c), and the bores 8a, 8b for receiving a second pivot axis 9, via which the actuating rod 10 is coupled to the spoon, are provided in parts 3, 4 which are located at either side of the recess 2.

Furthermore, the spoon is provided with the conventional longitudinal slot 11 having an axis of symmetry 11a, the slot ending in a widened opening 12a on the one hand and in the widening 12b on the other hand; the deepened parts 13a, 13b are formed on either side thereof.

In the preferred embodiment of the invention illustrated the spoon halves 14 and 15 respectively, which are located on either side of the longitudinal slot 11, are of unequal length: the distance between the most forwardly situated point 16a of the front edge 16 of the spoon half 14 and the pivot axis 6 is larger than the distance between the foremost point 17a of the front edge 17 of the spoon half 15 and this pivot axis. The two spoon halves 14, 15 are moreover bluntly rounded at the front ends, as indicated by reference numerals 18 and 19 respectively.

Figure 1:
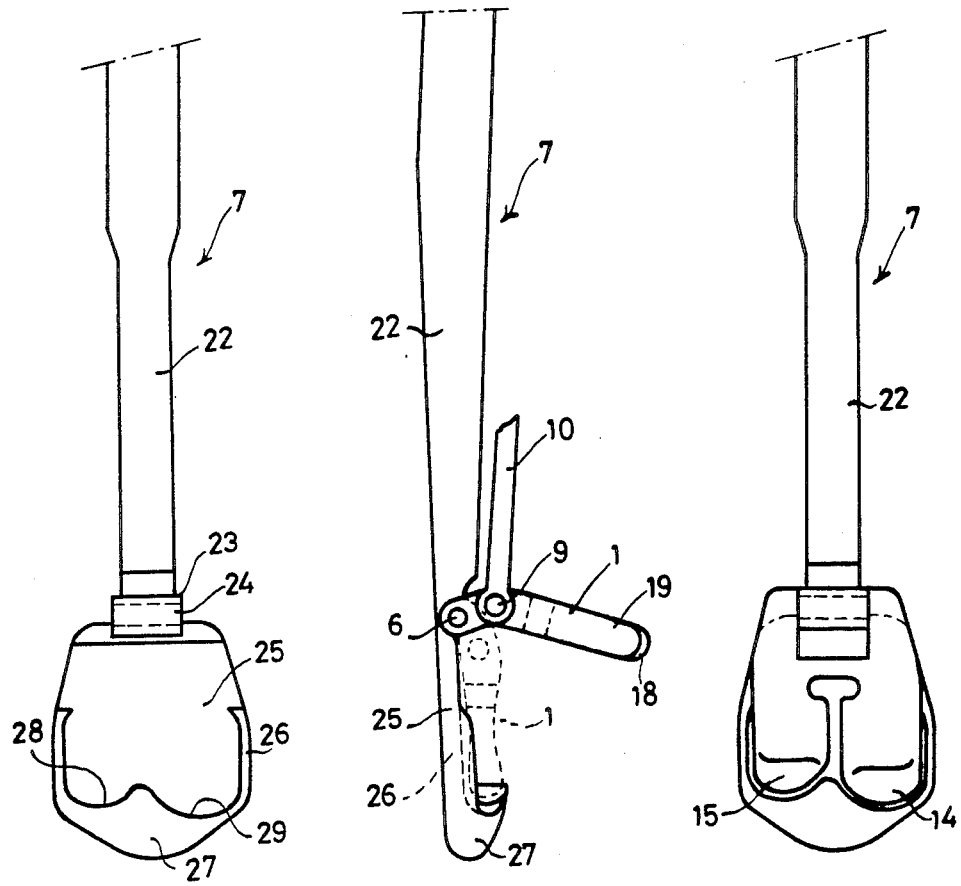
FIG. 1a is a plan view of the embodiment of the device according to the invention, shown without the associated spoon.
FIG. 1b is a side view of this embodiment.
FIG. 1c is a plan view of this embodiment but now with the spoon.

The preferred shape of the carrier 7, can be seen in FIGS. 1a–1c. These figures only show the lowermost part of the carrier; the invention does not relate to the manner in which the carrier, with a number of others, is fixed to an installation.

According to the invention, the distance $d_1$ from the boundary of the widened entry section 2b is, for a determined position on the axis of symmetry 11a, for example position 11b, larger for one spoon half than it is for the other spoon half (indicated by $d_2$).

The lowermost rod-shaped part 22 of the carrier merges, via a transition 23 in which the bore 24 for receiving the pivot axis 6 is formed, in the spoon support part 25 having raised side edges 26 and ending in a thickened and rounded front edge 27 with innermost edges 28, 29, the contour of which corresponds to that of the front edges of spoon halves 14 and 15 respectively. In the position in which the spoon is turned over, shown by dotted lines, the front edges of spoon halves 14, 15 connect with the front edge 27 so that the introduction of the spoon into the bird is not hindered; after the introduction the spoon is turned over in the conventional manner, via the actuating rod 10. The broken lines in FIG. 1b indicate an intermediate position of the spoon movement. The asymmetrical configuration, used according to the invention and described above, of a preferred embodiment of the spoon, in which configuration the spoon half located at the side of the gullet, which crosses over the spine and extends towards the crop, is made shorter than the other, is intended to prevent the gullet from being crushed, while it is ensured that the gullet enters the slot of the spoon correctly. During the withdrawing of the spoon the gullet is pulled into the longitudinal slot 11, moves upwards in this slot and finally comes to rest in the widening 12 at the point of transition into the gizzard. The thinner gullet is however not jammed therein so that sticking of the packet of entrails, via a jammed gullet, to the spoon after removal of the entrails, is prevented.

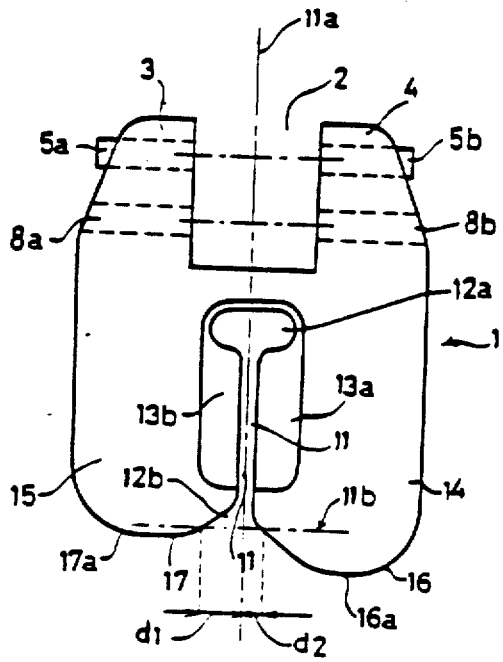

What is claimed is:

1. Device for the removal of the internal organs of slaughtered poultry, comprising a spoon which is attached to the end of an oblong carrier, is pivotable about an axis lying transversely on the longitudinal axis of the carrier, and has a rounded front edge and a longitudinal slot running in the longitudinal direction of the spoon and opening in a widened entry section, in which the entry section is made asymmetrical in such a manner, that, at corresponding positions along the axis of symmetry of the longitudinal slot, the distance from the edge of the widened entry section is larger for one spoon half than it is for the other.

2. Device according to claim 1, in which the spoon half, for which the distance mentioned is larger, is shorter than the other spoon half.

3. Device according to claim 1, in which the longitudinal edges of the spoon are parallel with the longitudinal slot over virtually the entire length of the spoon.

4. Device according to claim 1, in which the longitudinal slots ends in a widened opening.

5. Device according to claim 1, in which a deepened part is formed in each of the spoon halves adjacent to the longitudinal slot.

6. Device according to claim 1, in which a spoon support surface at the end of the carrier, past the spoon end, which ends in a thickened and rounded front edge of which the inner border connects with the contours of the edge of the respective spoon half.

* * * * *

UNITED STATES PATENT AND TRADEMARK OFFICE
CERTIFICATE OF CORRECTION

PATENT NO. : 4,724,581

DATED : February 16, 1988

INVENTOR(S) : J. A. van de Nieuwelaar

It is certified that error appears in the above-identified patent and that said Letters Patent is hereby corrected as shown below:

The title page should be deleted to appear as per attached title page.

Signed and Sealed this

Eighth Day of November, 1988

Attest:

DONALD J. QUIGG

Attesting Officer

Commissioner of Patents and Trademarks

United States Patent [19]
van de Nieuwelaar

[11] Patent Number: 4,724,581
[45] Date of Patent: Feb. 16, 1988

[54] EVISCERATING DEVICE

[75] Inventor: Josephus A. van de Nieuwelaar, Germert, Netherlands

[73] Assignee: Stork PMT B.V., Netherlands

[21] Appl. No.: 702,084

[22] Filed: Feb. 15, 1985

[30] Foreign Application Priority Data

Feb. 16, 1984 [NL] Netherlands .................. 8400506

[51] Int. Cl.⁴ ............................................. A22C 21/06
[52] U.S. Cl. ............................................. 17/11
[58] Field of Search ................................ 17/11

[56] References Cited
U.S. PATENT DOCUMENTS 2,189,752  2/1940  Breitschwerdt ............ 17/11
4,019,222  4/1977  Scheier et al. ............ 17/11

Primary Examiner—Willie G. Abercrombie
Attorney, Agent, or Firm—Newton, Hopkins & Ormsby

[57] ABSTRACT

Eviscerating device with a spoon at the end of an oblong carrier pivotable about an axis transversely on the longitudinal axis of the carrier, and with a rounded front edge and a longitudinal slot in the longitudinal direction of the spoon, opening into an asymmetrical widened entry section, such that at corresponding positions along the axis of symmetry of the longitudinal slot the distance from the edge of the widened entry section is larger for one spoon half than it is for the other.

6 Claims, 5 Drawing Figures